United States Patent [19]
Wolter et al.

[11] Patent Number: 5,768,459
[45] Date of Patent: Jun. 16, 1998

[54] OPTICAL WAVEGUIDE COUPLING DEVICE

[76] Inventors: Klaus Wolter; Dieter Henke, both of Friedrich-Wilhelm-Str. 32, 40625 Dusseldorf, Germany

[21] Appl. No.: 737,874
[22] PCT Filed: May 24, 1995
[86] PCT No.: PCT/EP95/01995
§ 371 Date: Nov. 25, 1996
§ 102(e) Date: Nov. 25, 1996
[87] PCT Pub. No.: WO95/32445
PCT Pub. Date: Nov. 30, 1995

[30] Foreign Application Priority Data

May 25, 1994 [DE] Germany .................. 44 18 136.1

[51] Int. Cl.$^6$ ......................................... G02B 6/36
[52] U.S. Cl. ............... 385/88; 385/89; 385/90; 385/92
[58] Field of Search ................................ 385/88-94

[56] References Cited

U.S. PATENT DOCUMENTS

| | | | |
|---|---|---|---|
| 4,225,214 | 9/1980 | Hodge et al. | 350/96.21 |
| 4,533,209 | 8/1985 | Segerson et al. | 350/46.2 |
| 5,104,242 | 4/1992 | Ishikawa | 385/53 |
| 5,245,688 | 9/1993 | Watanabe et al. | 385/137 |
| 5,337,396 | 8/1994 | Chen et al. | 385/92 |
| 5,631,989 | 5/1997 | Koren et al. | 385/91 |

FOREIGN PATENT DOCUMENTS

| | | |
|---|---|---|
| 0015309 | 9/1980 | European Pat. Off. . |
| 0147231 | 7/1985 | European Pat. Off. . |
| 0335367 | 10/1989 | European Pat. Off. . |
| 0392679 | 10/1990 | European Pat. Off. . |
| 2097419 | 3/1972 | France . |
| 1488409 | 10/1977 | United Kingdom . |

*Primary Examiner*—Phan T. H. Palmer
*Attorney, Agent, or Firm*—Woodbridge & Associates

[57] ABSTRACT

The invention refers to an optical waveguide coupling device with several optical waveguide conductors, connected by ridges, with a housing, comprising on one side an insertion aperture for an optical waveguide and on another side connecting means, whereby the insertion aperture is connected to the connecting means by way of a cable guide, in the interior of the housing and whereby the cable guide, in the vicinity of the insertion aperture, has a resiliently mounted clamping element for holding the optical waveguide, which allows the optical waveguide to move in the direction of the housing and prevents it from moving in the opposite directions. An improved optical waveguide coupling which can be handled easily and quickly is characterized in that the cable guide branches over at least one separating element for separating to guides for the optical waveguide conductors, whereby the guides lead to the respective connecting means, whereby each guide is allocated at least one separation plane of the separation element, in such a way that during advance of the optical waveguide cable, tearing forces act on the ridges between the optical waveguide conductors and the optical waveguide cable is split into individual conductors or groups of conductors which are guided into the guides.

10 Claims, 4 Drawing Sheets

OPTICAL WAVEGUIDE COUPLING DEVICE

The present invention relates to an optical waveguide coupling device.

A coupling device for connecting opto-electrical components to waveguides is well known. This coupling device essentially consists of a bottom part and a top part fixed to it. Both bottom and top parts are provided with recesses which, when the two parts are assembled, form guides for the end of an optical waveguide and accommodate two opto-electrical components. The end of an optical waveguide is fitted with such a coupling device by inserting the optical waveguide end with its individual conductors into the respective guides provided in the bottom part. Then the top part is put in place and screwed on so that the optical waveguide is clamped between the bottom part and top part.

It is disadvantageous that the installation of such a coupling device to the end of an optical waveguide is complicated because several individual elements must first be positioned in respect to each other and then connected with each other. In addition, a tool, for example a screwdriver for screwing together the bottom part with the top part, is required. A further disadvantage is that this device does not provide any measures for screening the cable guide, neither for the case where an optical waveguide is not fitted, nor for the case where the housing is opened. Due to possible problems with intrusion of parasitic light or with trapping electromagnetic waves, the optical waveguide coupled with opto-electrical components can thus not be exchanged during operation.

Based on this, it is an object of the present invention, to provide such developments and improvements to an optical waveguide coupling device that it can be handled easily and quickly. It is a further object of the invention to provide—taking into consideration electromagnetic compatibility and screening against parasitic light—a plug-in coupling which enables repeated unplugging under operating conditions as well as generally; that provides strain relief for the optical waveguide and enables exact positioning of the optical components.

These objects are solved by an optical waveguide coupling device with a housing, comprising on one side an insertion aperture for an optical waveguide and on another side connecting means, whereby the insertion aperture is connected with the connecting means by way of a cable guide in the interior of the housing and whereby the cable guide, in the vicinity of the insertion aperture, is provided with a resiliently mounted clamping element for holding the optical waveguide, which allows the optical waveguide to move in the direction of the housing and prevents it from moving in the opposite direction.

A particular advantage of this coupling device is that it can be connected to the end of an optical waveguide without the need to position various components of the coupling device in relation to each other and to connect them with each other. Nor are there any tools required for this. Connection is merely by sliding the end of the optical waveguide directly into the coupling device. As soon as the optical waveguide is inserted into the insertion aperture, the clamping element protects it against pulling out. In this manner, the time required for connecting an optical waveguide to the coupling device is significantly shortened.

As an example, the connecting means can be provided for the ends of optical waveguides or for electro-optic elements seated in plugs or developed as plugs. But it is also possible to design the connecting means as optical waveguide take-ups. Thus quick, simple and reliable coupling of optical waveguides is made possible.

In an advantageous embodiment the cable-guide branches via at least one splice element to guides towards the connecting means, in this at least one splice plane of the splice element is allocated to each guide. During insertion into the insertion aperture, a multi-conductor optical waveguide is led through the cable guide onto the splice element. Thereby it is spliced by the splice element in such a way that the individual conductors or group of conductors as splice ends are guided to the connecting means provided for this purpose until they have reached the end of the guides, towards the connecting means. In this way, during installation, manual division of a multi-conductor optical waveguide into individual conductors or groups of conductors is no longer necessary. Just as advantageous is the feature whereby the junction in the cable guide via the splice element to the guides forms a light trap, in such a way that where there is no optical waveguide in place, the optical connections seated in the connecting means are protected from direct light incidence.

In a further preferred embodiment, each splice element, at the side facing the optical waveguide, is provided with at least one raised cutting edge, parallel to the optical waveguide. Alternatively, or additionally, the splice element comprises at least one pyramid-shaped wedge tapering off in the direction of the insertion aperture. By means of these embodiments a multi-conductor optical waveguide can be split as desired, according to the required type of connection. Thus these embodiments are particularly well suited for optical waveguides with two conductors. If an optical waveguide is inserted through the insertion aperture into the coupling device, it slides onto the wedges so that in conjunction with the interplay of the wedges, tearing forces act on the optical waveguide, perpendicular to its cable axis, so that the two conductors are split during insertion, without much resistance.

From a design point of view the clamping element can simply be embodied as a leaf spring which, at the side facing the optical waveguide, is provided with ribs inclined in the direction of insertion. In addition it can preferably be arranged in such a way that it shields the cable guide from the intrusion of electromagnetic radiation if no optical waveguide is inserted in the coupling device. In this case, one single design element guarantees effective screening against parasitic light and shielding from electromagnetic irradiation in every case. Among other instances this is advantageous when the coupling device is used as a connector box, and optical waveguides are frequently coupled and decoupled.

In an advantageous embodiment the clamping element is provided with manually-operated means for undoing the clamping element, against the clamping force. Thus the optical waveguide can be released from the coupling device at any time, without it or the coupling device being damaged as a result of this. Further advantages stem from the fact that when an optical waveguide is exchanged, for example for repair purposes, there is no need to open the housing. This means that an optical waveguide can be replaced even during operation, without there being any problems as a result of light incidence or electromagnetic radiation. Furthermore, the coupling device can be used many times over and need not be disposed of together with a defective cable.

Due to the guides or the cable guides tapering off towards the side facing the connecting means, the splice ends can easily be brought into the coupling device—when inserting the optical waveguide—in a precisely defined position in relation to the connecting element.

Furthermore, the connecting means can comprise resiliently mounted engaging protrusions and/or adjusting protrusions. Thus connecting elements, for example a connector with the respective recesses, can be brought into a precisely defined position in relation to a splice end, without the need for any further adjustment work. In addition, the resilient mounting of the engaging protrusions ensures that on the one hand the plug is firmly seated in the connecting means, and on the other hand can easily be released.

The coupling device preferably has elastic elements which apply such force on the elements to be coupled that, when they are coupled, they move towards each other. In this way, loss of contact between the optical waveguide cable and the connection, for example due to dislocation of the optical waveguide cable in its sheath, can be avoided.

Further, the wall surfaces between the guides or the cable guides and the connecting means can be metallized. In this way, in case of operator error (for example not plugging the optical waveguide in right up to the end stop) nevertheless as much light as possible can be conducted to the optical or electro-optical elements seated in the connecting means.

The coupling device according to the invention, at the housing exterior, can have a shoulder for support against an abutting surface. This shoulder serves to support the housing against an abutting surface under tensile load of the optical waveguide. In this way, tensile forces are absorbed by the housing, via clamping element and shoulder, without the elements seated in the connecting means—for example connectors—experiencing tensile strain.

The shoulder preferably comprises a break-off position, so that the housing breaks at a precisely defined position if the tensile load is too great.

In addition, the housing, from the interior and/or exterior, can be embodied with an electrically conductive coating, in such a way that it is shielded from electromagnetic radiation. The clamping device can also be embodied with sufficient electrical conductivity, that when no optical waveguide is in place, the insertion aperture is provided with very high shield damping against electromagnetic waves. This can for example also be attained by matching the length of the cable guide and its inside width in such a way that intrusion of electromagnetic radiation into the connecting means is avoided.

The same shielding effect against interfering electromagnetic irradiation can be attained by constructing the coupling device completely from electrically conductive material.

Below, the invention is set out by means of a preferred embodiment, with accompanying drawings in which.

Figure 1:
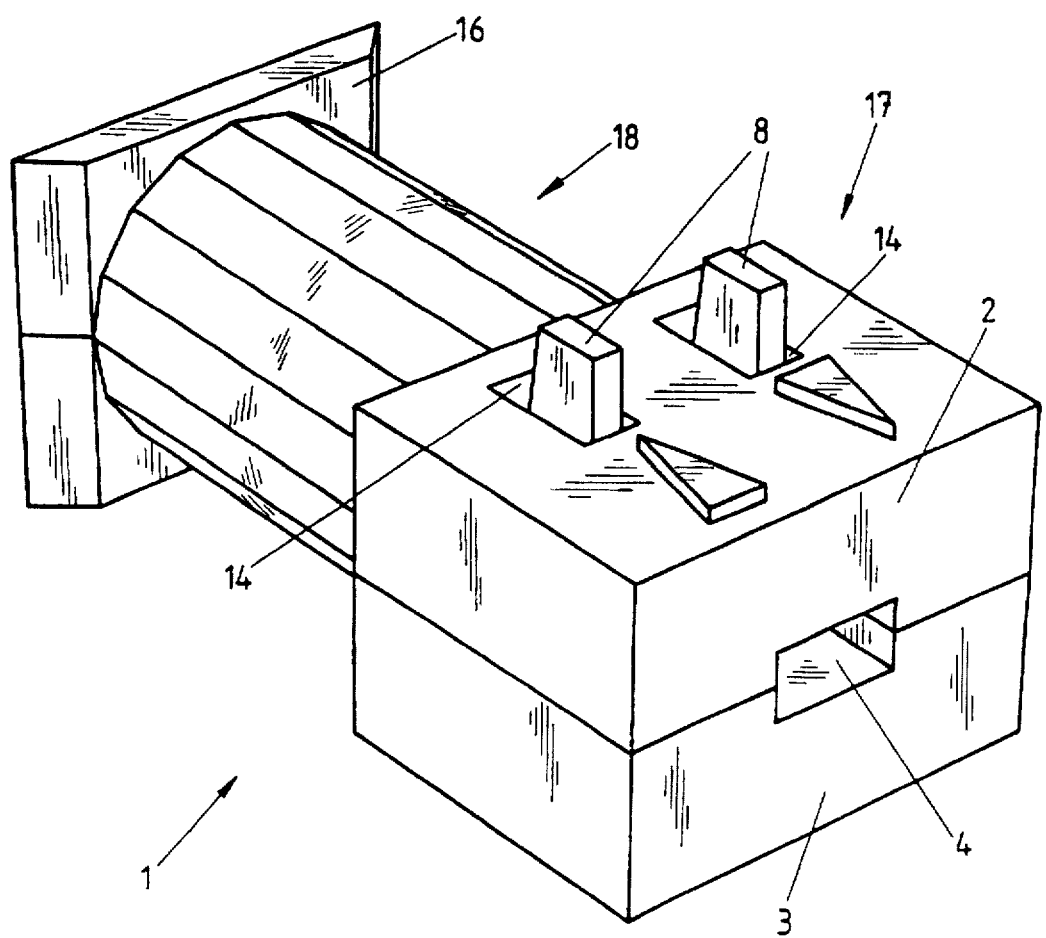
FIG. 1 is an isometric drawing of the coupling device from above.

The preferred embodiment of the coupling device comprises a two-part housing 1 with a top 2 and a bottom 3. At its front, the coupling device is provided with an insertion aperture 4 formed by recesses in top 2 and bottom 3 (FIG. 1).

Figure 3:
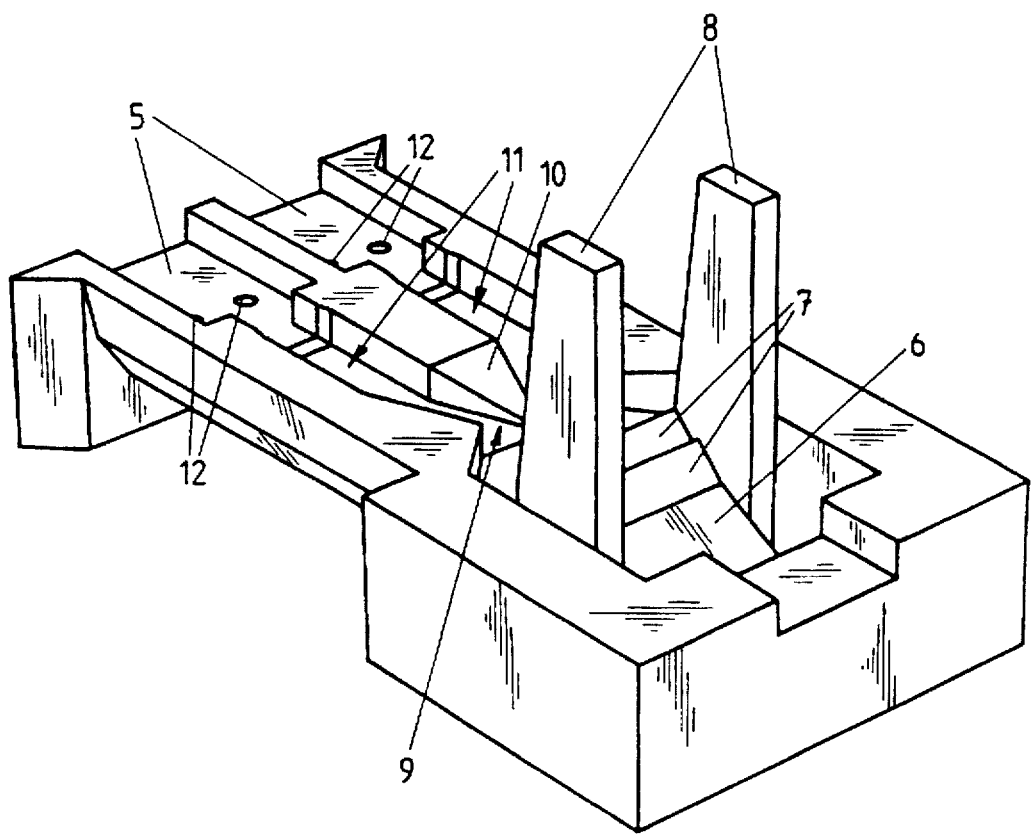
FIG. 3 is an isometric drawing of the bottom of the coupling device from above.

Top 2 (FIG. 4) and bottom 3 (FIG. 3), behind the recesses for the insertion aperture 4, are provided with channel-like recesses which essentially serve as cable guides for the optical waveguide from the insertion aperture 4 to the connecting means 5. The length of the channel-like recesses is matched in such a way to their inside width, that optimal shielding against electromagnetic irradiation is attained. In the area of these recesses behind the insertion aperture 4, the bottom is provided with a leaf spring 6 which essentially acts in the direction of the top and which embodies, at its top, ribs which are positioned across the axis of the channel and are inclined in the direction of insertion. Positioned at the side of the leaf spring 6 are two projecting pegs 8, by means of which the leaf spring 6 can be moved against the spring resistance.

Aligned with leaf spring 6 and insertion aperture 4, a threading aperture 9 and a splice element 10 are adjacent to the leaf spring 6. The splice element 10 is embodied as a pyramid-shaped wedge tapering off in the direction of the insertion aperture 4. The guides adjacent to the splice element 10 terminate in the connecting means 5. At their end facing the connecting means, the guides 11 taper off, so that exact positioning of the splice ends with the connecting means 5 takes place automatically when a multi-conductor optical waveguide is inserted.

The junction in the cable guide prevents light entering directly through the coupling device. In this way, the optical and/or electromagnetic connections seated in the connecting means 5 are protected from direct light incidence when there is no waveguide in position. This light trap also causes light which may be issued from light emitting elements in the connecting means to enter the surroundings directly.

The connecting means 5 are essentially formed by right-angle recesses. They are embodied with sprung engaging protrusions 12 located in the bottom 3 which serve to retain a connector and ensure its exact positioning in relation to the splice ends.

Figure 4:
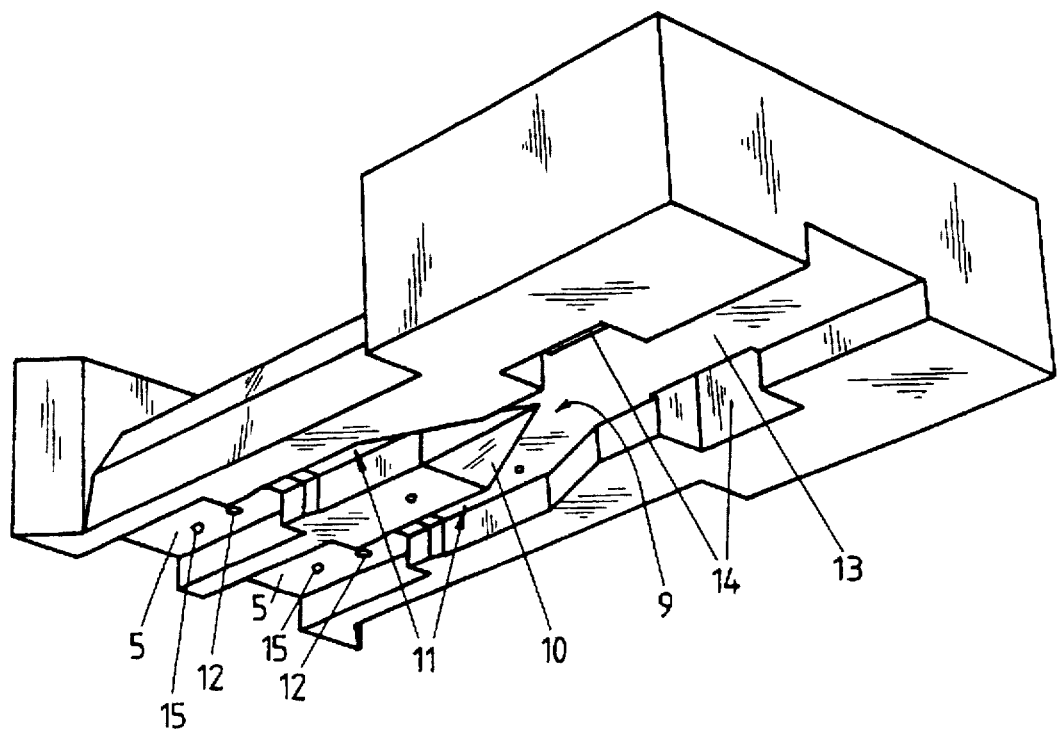
FIG. 4 is an isometric drawing of the top of the coupling device from below.

The shape of the top 2, as far as entrance opening 4, threading aperture 9, splice element 10, guides 11, connecting means 5 and engaging protrusions 12 are concerned, is identical to the one of the bottom 3 (FIG. 4). Instead of the leaf spring 6, the top 2 is merely provided with a flat section 13 as an abutting surface for leaf spring 6 as well as apertures 14 for the pegs 8 through which force can be applied from the outside to the leaf spring 6. In addition, at the top side of the connecting means 5, apart from engaging protrusions 12, adjusting protrusions 15 are provided which, just like engaging protrusions 12, are used for exact positioning of the connector.

The housing 1 is provided with a shoulder 16 and a housing head 17 at the take-up side which both protrude with their exterior dimensions beyond the circumference of a cylindrical middle section 18. This enables the housing 1 to be inserted into the walls of equipment with housing head 17 and shoulder 16 being supported at either side of the equipment wall.

For coupling with an optical waveguide it is possible, for example, without further resources, to insert opto-electronic components developed as connectors simply into the connecting means 5. Due to the interaction of engaging protrusions 12 and adjusting protrusions 15 and the respective recesses to be provided in the connectors, the connectors are positioned exactly in the connecting means. In order to install the multi-conductor optical waveguide in the coupling device, it is merely necessary to ensure that the optical end of the optical waveguide is operative. The optical waveguide can then be inserted into the insertion aperture 4. During insertion, the optical waveguide pushes leaf spring 6 aside. Thereby, leaf spring 6 is tensioned and pushes the optical waveguide towards the flat section 13 of top 2. If tension is now applied to the optical waveguide against the direction of insertion, then leaf spring 6, as a result of static friction between the ribs 7 and the optical waveguide, is still further tensioned so that the optical waveguide is pushed more forcefully towards flat section 13. For this reason the optical waveguide, on account of tensile load applied, can only move a little against the direction of insertion. If the optical waveguide is to be released again from the coupling device, leaf spring 6 must be depressed by means of pegs 8, so that spring resistance can no longer bear on the optical waveguide. In this case the optical waveguide can simply be removed from the coupling device.

When inserting the multi-conductor optical waveguide, its end is pushed onto the splice element 10. Because of the embodiment of the splice element 10, with increasing forward feed, tearing forces act on the ridge or ridges between the conductors, perpendicular to the cable axes, so that the optical waveguide is split into individual conductors or groups of conductors as splice ends, without undue resistance during insertion. In addition, splice element 10 takes over the task of guiding the splice ends into the guides 11 to the connecting means 5.

Figure 2:
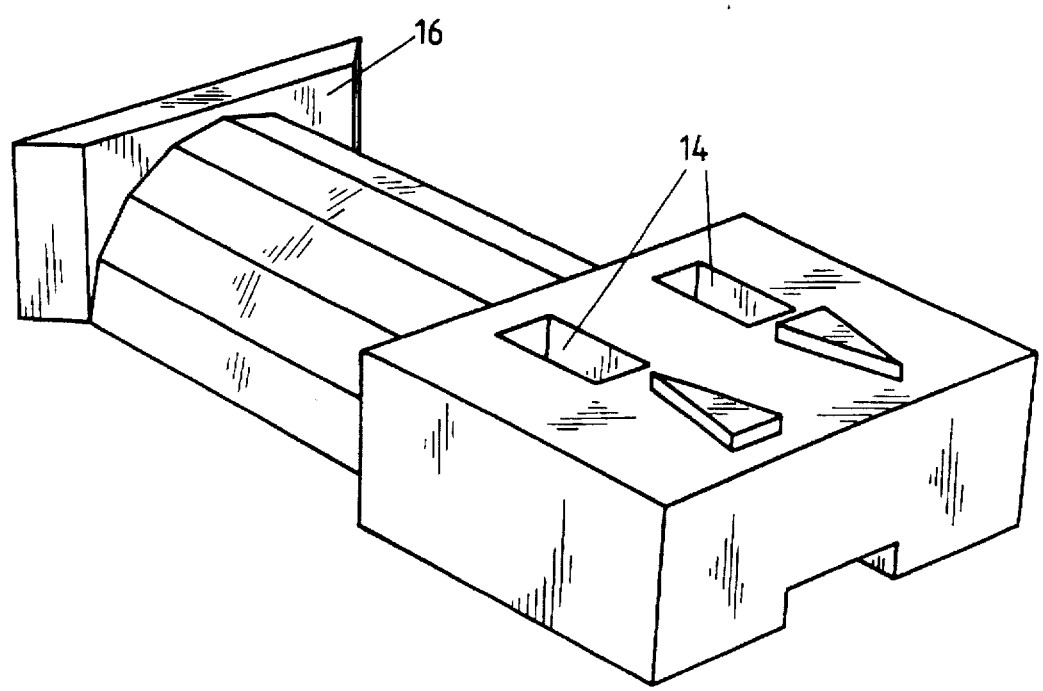
FIG. 2 is an isometric drawing of the top of the coupling device from above.

As explained above, this preferred embodiment, as described, which is particularly suitable for optical waveguides with two conductors, comprises the function elements bottom (FIG. 3), and, acting as an abutting surface to it, top (FIG. 2). The embodiment is characterised by two function blocs:

the handling blocks with insertion aperture and clamping element for the multi-conductor optical waveguide; and the guide collar with splice element, cable guide, support for example for the electro-optical components and moulded part for positive locking to the electronics carrier which serves as lead-in into standard equipment hoods.

The following are the essential design parts of this embodiment, listed from the insertion aperture for the optical cable to the moulded part for positive locking to the electronics carrier:

the insertion aperture for the optical waveguide;

the spring; it is characterized in that in the direction of insertion it can easily be pushed aside by the cable; this will tension it and push the cable against the abutting surface, the top (normal condition); if tension is now applied to the cable against the direction of insertion of the cable, then the spring further tensions by static friction at the optical waveguide and presses the optical waveguide still further towards the abutting surface; as a result the optical waveguide moves only slightly from its normal position; if this tensile load is released, the spring with the optical waveguide returns to its normal position again; the optical waveguide can be removed by pushing away the spring; to this purpose a push-away device is provided which by its protrusion through the top is easy to operate;

the cable guide with threading aperture, splice element and adjacent guides for the individual conductors, as well as tapering off of the guides for fine positioning; the splice element is designed for ribbon conductors and has two functions, one to position or guide the ribbon conductor, and the other to separate the individual conductors of the ribbon conductors; the present design is characterized in that because of the ribbon conductor sliding onto the wedge and interaction with the abutting surface in the top, tearing forces are applied to the ridge between the conductors, perpendicular to the cable axis, so that the two conductors are split without undue resistance during insertion;

the guiding and mounting of the electro-optical components by means of engaging protrusions/adjusting protrusions;

trapezoid projection for positive locking to an electronics carrier; because of this positive-locking element, any tension applied to the optical waveguide is applied directly to the electronics carrier without the contact positions between the electro-optical components and the carrier being placed under load; the trapezoid projection is designed in such a way that too great a tensile load leads to a safety rupture.

We claim:

1. An optical waveguide coupling device with several optical waveguide conductors, connected by ridges, with a housing (1), comprising on one side an insertion aperture (4) for an optical waveguide and on another side connecting means (5), whereby the insertion aperture (4) is connected to the connecting means (5) by way of a cable guide in the interior of the housing (1) and whereby the cable guide, in the vicinity of the insertion aperture, has a resiliently mounted clamping element for holding the optical waveguide, which allows the optical waveguide to move in the direction of the housing (1) and prevents it from moving in the opposite direction, characterized in that the cable guide branches over at least one separating element for separating (10) to guides (11) for the optical waveguide conductors, whereby the guides (11) lead to the respective connecting means (5), whereby each guide (11) is allocated at least one separation plane of the separation element (10), in such a way that during advance of the optical waveguide cable, tearing forces act on the ridges between the optical waveguide conductors and the optical waveguide cable is split into individual conductors or groups of conductors which are guided into the guides (11).

2. A coupling device according to claim 1, characterized in that each separating element (10), at the side facing the optical waveguide, comprises at least one raised cutting edge, parallel to the optical waveguide.

3. A coupling device according to claim 2, characterized in that each separating element (10) comprises at least one pyramid-shaped wedge tapering off towards the insertion aperture (4).

4. A coupling device according to claim 1, characterized in that the clamping element is a leaf spring (6) which, at the side facing the optical waveguide, is provided with ribs (7) inclined in the direction of insertion.

5. A coupling device according to claim 4, characterized in that the clamping element embodies manually-operated means for undoing the clamping element, against the clamping force.

6. A coupling device according to claim 1, characterized in that the clamping element is shaped in such a way that it completely shields the cable guide if no optical waveguide is inserted in the coupling device.

7. A coupling device according to claim 1, characterized in that the connecting means (5) comprise resiliently mounted engaging protrusions (12) and/or adjusting protrusions (15).

8. A coupling device according to claim 1, characterized in that elastic elements are provided which apply such force to the elements to be coupled that, when they are coupled, they move towards each other.

9. A coupling device according to claim 1, characterized in that the coupling device consists entirely of electrically conductive material.

10. A coupling device according to claim 1, characterized in that the length of the cable guide and its inside width are matched in such a way that intrusion of electromagnetic radiation into the connecting means (5) is avoided.

* * * * *